Patented Dec. 18, 1934

1,985,200

UNITED STATES PATENT OFFICE 1,985,200

LINOLEUM AND METHOD OF MANUFACTURE

Robert D. Bonney and Walter S. Egge, Glen Ridge, N. J., assignors to Congoleum-Nairn, Inc., a corporation of New York No Drawing. Application June 4, 1930, Serial No. 459,254

12 Claims. (Cl. 87—17)

The present invention relates to the manufacture of linoleum and more particularly to the improvements in the manufacture of the cement or binder employed in the production of linoleum.

Linoleum was developed and patented (United States Patent #87,277) by Frederick Walton more than fifty years ago. His original linoleum composition consisted essentially of a cement or binder comprising oxidized linseed oil, rosin and gums especially prepared and combined with filler material such as wood pulp, ground cork or the like, with pigments added to give the desired color. While numerous changes in the proportion and kinds of material have been suggested, and modified and shortened processes have been proposed, nevertheless the essential characteristics of the product and its method of manufacture are generically the same today as they were fifty years ago.

The manufacture of linoleum, as developed by Walton and as carried out at the present time, is divided into four distinct stages which may be briefly described as follows—

*I. Solidification of the linseed oil.*—The first stage is the oxidation or solidification of the linseed oil to be used in the binder. The two conventional methods now employed are the Walton or "scrim" process, and the Wood-Bedford or mechanically oxidized oil process. The Walton process (British Patent 209, of 1860) consists in successively flooding vertically suspended cotton fabrics or "scrims" with linseed oil which has been boiled with suitable driers, each layer being allowed to oxidize or dry before being followed by the next flooding. This process is exceedingly slow requiring from 2 to 4 months to produce a "skin" of oxidized oil suitable for use. The Wood-Bedford process (British Patent #7742 of 1893) on the other hand is a rapid process being completed in 12 to 18 hours. It consists essentially in aerating and agitating linseed oil, together with suitable driers in a closed cylindrical vessel. A temperature of approximately 180° F. is maintained and aeration and agitation is continued until the oil has oxidized and thickened to the desired consistency. Obviously, the Wood-Bedford process offers a great advantage in time saving, but unfortunately the solidified oil produced thereby is somewhat inferior to that produced by the "scrim" process.

*II. Preparation of the cement.*—The next step in the manufacture of linoleum is the production of the cement or binder from the solidified oil. The original and yet up-to-date process as described by Walton consists in fluxing, in a kettle of well known construction, the solidified oil produced in the first stage, with resinous material such as rosin, Kauri gum, etc. Solidified oil produced by either the Walton or Wood-Bedford process above described may be used but in order to produce a satisfactory cement it has been found necessary to use at least a substantial amount, usually fifty percent, of Walton process oil in order to obtain a cement of the desired consistency. The proportion of resinous material varies from 20 to 35% but invariably such resinous material comprises a considerable portion of rosin. The fluxing is carried on at a temperature of 250 to 340° F. and under conditions substantially excluding air. The solidified oil, upon agitation with the rosin constituent of the melted resinous material becomes fluid and in this state the constituents of the cement may be thoroughly and intimately mixed. Upon continued heating, however, the mix gradually thickens, and the thickening is continued until the viscous mass is adjudged by the operator to be of the proper consistency for cement. It is then dumped into pans to cool.

*III. Formation of linoleum composition.*—The third stage in the manufacture of linoleum, consists in thoroughly and intimately combining the cement formed in the preceding stage with ground cork or wood flour fillers, and pigments. The composition normally comprises about 35 to 40% of cement or binder. The incorporation of the several ingredients of the composition is usually accomplished by a series of kneading and mixing machines well known in the art.

*IV. Formation of linoleum.*—The fourth and last stage concerns the application of linoleum composition in one or more colors to a suitable backing web, usually burlap, and subsequently seasoning or stoving the floor covering formed thereby to harden and toughen the same. Various methods are employed, resulting in the production of the conventional types of linoleum known as plain linoleum, straight line inlaid, moulded inlaid, etc. The seasoning is usually carried on in huge stoves maintained at a temperature of 150–170° F. and requires from 2 to 8 weeks for completion.

The reactions occurring in the first stage, that is, the solidification of the linseed oil under oxidizing conditions, are highly complex. Apparently, however, it may be considered as occurring in two successive steps, the primary step being an oxidation of the unsaturated glycerides of which linseed oil is principally composed, and the secondary step being a coagulation or aggregation of the molecules of oxidized oil to form a gel-like solid known as linoxyn. In the solidification of the oil, either by the Walton process or by the Wood-Bedford process, the gelation or coagulation of the oxidized oil molecules first formed, commences before the oxidation step is far advanced. As the coagulation proceeds, the oil is thickened thereby retarding the access of the air to the remaining unoxidized oil. Because of this condition there is always to be found in the resulting solidified oil product a considerable amount of unoxidized oil. Similarly the step of coagulation or gelation does not go to completion and there is present in the final product a considerable amount of oxidized but not coagulated oil which at normal temperature exists as a fluid. The solidified oils produced by either the Walton or Wood-Bedford processes usually contain upwards of 30% unoxidized oil. Of the remaining portion of the Walton oil, the major constituent is linoxyn, of very stable or rigid gel construction, while of the remaining portion of Wood-Bedford oil the major constituent is oxidized but not coagulated oil. The efficiently as a binder in linoleum of the cement formed from the solidified oil depends almost entirely upon the amounts and ratios of these three components which make up the solidified oil and, in general, it may be said that the less the amount of unoxidized oil present, the more satisfactory will be the cement, provided the ratio of the other two components of the solidified oil is regulated to obtain the necessary body or consistency in the cement.

The reactions occurring in the second stage, i. e. the preparation of the cement, are also complex. The change in phase of the solidified oil from a solid to a fluid is due to the heat and the dispersing or peptizing effect of the rosin on the linoxyn or coagulated oxidized oil. Because of the high temperature, however, there occurs some chemical or physical reactions between the rosin and the oil or its reaction products and in a short time the property of the rosin to function as a dispersing agent is lost, a coagulation of the oxidized oil molecules commences, and the mass again solidifies. The intimacy of the mixture of oxidized oil and resinous material depends chiefly upon the property of rosin to effect a dispersion of the relatively stable gel structure of the solidified oil produced by the Walton process. This property is well known in the art, being similar to the peptizing effect of rosin in preventing premature coagulation of siccative oils under oxidizing conditions (British Patent 1386 of 1901).

The reactions occurring during the fourth stage, i. e., the seasoning of the linoleum are two-fold; first, an oxidation or partial oxidation of the unoxidized oil present in the binder, and second, a coagulation or gelatin of the oxidized but not coagulated oil to produce solid linoxyn. The coagulation occurs, under the temperature conditions maintained, relatively rapidly and uniformly throughout the sheet of linoleum and is apparently independent of any contact with the air. The oxidation of the unoxidized oil is, however, a much slower reaction and does depend upon contact with the air, taking place readily only at or near the surface of the linoleum. Because of this fact, the length of the stoving period bears a direct relation to the proportion of unoxidized oil present in the cement binder employed, the less the amount of unoxidized oil, the shorter the stoving or seasoning time. Furthermore, where the cement contains any considerable amount of unoxidized oil there will be found in the thicker gauges of linoleum, after seasoning, an undesirable soft center stratum, apparently due to the failure of the unoxidized oil constituent to become oxidized and solidified.

Our invention contemplates certain improvements in the conventional four stage process of making linoleum whereby a greatly improved product is obtained and whereby the advantages of the present conventional method may be realized without entailing the deficiencies and disadvantages thereof. More particularly our invention enables the production of a high quality solidified oil by the rapid Wood-Bedford process, such solidified oil being particularly adapted to provide the entire oil component of the cement. Another major advantage is that this solidified oil may be fluxed to obtain a cement without the use of rosin as heretofore required, thus permitting the incorporation therewith of a wide variety of resinous materials, particularly synthetic resins adapted to yield a product having a high resistance to alkalies. Another advantage is that the cement produced in accordance with our invention contains very substantially less unoxidized oil which in turn shortens the period required for seasoning of the linoleum. A still further advantage is the increased efficiency of the cement as a binder, thus enabling the use of a less proportion thereof in the formation of the linoleum composition. A still further advantage of our invention is that it is adapted to be carried out in the conventional equipment now in commercial use without modification of the same. Other advantages will appear from the following description of the general and specific features of our process invention and the product obtained thereby.

All of these contemplated advantages and improvements are based upon the discovery that small amounts of certain substances if present during the first stage or solidification of the oil, function as catalysts to produce a solidified oil product in which an optimum ratio of the several components thereof is obtained; and upon the further discovery that small amounts of certain other substances if present during the second stage or preparation of the cement, function to yield a cement having a maximum efficiency as a binder for linoleum. Our invention in its preferred embodiment contemplates conducting the first stage, i. e. the solidification of the oil in the usual manner of carrying out the Wood-Bedford process but in the presence of ¼ to 2% of boric acid or its equivalent as hereinafter defined, and subsequently conducting the second stage, i. e. the preparation of the cement, in the usual manner but preferably in the presence of ½ to 2% of zinc oxide or its equivalent as hereinafter defined.

We shall now describe a specific example illustrating the preferred method of carrying out our invention:

*First stage.*—A charge of 1,400 pounds of raw linseed oil, together with an effective amount of driers, such as lead, manganese or cobalt resinates or linoleates up to a metallic content of 2% by weight is placed in a mechanical oxidizer of the conventional Wood-Bedford type. To this charge is added ten (10) pounds of boric acid. The charge is then aerated and agitated in the usual manner. Air is supplied at the rate of about 50 cubic feet per minute and the temperature is maintained between 160° to 220° F. Treatment is continued for 18 to 24 hours until a cooled sample has the consistency of a jelly-like solid, at which time the solidification of the oil is considered to have reached the proper point and the charge is dumped into pans to cool.

*Second stage.*—A charge composed of 1,185 pounds of solidified oil prepared as above described and 315 pounds of oil-soluble rosin-phenol-formaldehyde resin is placed in a cement kettle of the conventional type. The charge is heated to a temperature of 250° to 340° F. and agitated slowly. The solidified oil becomes fluid and is intimately mixed with the resinous material. Fifteen (15) pounds of zinc oxide is then added to the charge. As the agitation and temperature are continued, the mix begins to solidify again and the thickening is continued until the mass becomes a tough, rubbery, elastic solid and is adjudged by the operator to be of the proper consistency for cement.

The action of the boric acid catalyst during the solidification of the oil is not fully understood. Apparently, however, it serves to increase the ratio of the rate of the primary reaction (i. e. the oxidation of the unsaturated glycerides of the oil) to the rate of the secondary reaction (i. e. the gelation or coagulation of the oxidized oil.) Whatever may be the correct theory, however, the presence of boric acid during the solidification of the oil results in increased proportions of the linoxyn gel and the oxidized but not coagulated oil, and a markedly decreased proportion of unoxidized oil. As compared with the solidified oils prepared by the heretofore known conventional processes, which usually contain upwards of 30% unoxidized oil, the solidified oil produced according to our modified process contains but approximately 12% unoxidized oil. Furthermore the ratio of the linoxyn to the oxidized but not coagulated oil is such as to give the desired body or consistency to a cement produced entirely from this type of solidified oil. Another feature is that the linoxyn or solid component formed by our modified process has a relatively non-rigid or unstable gel structure which permits the solidified oil to be easily fluxed during the preparation of cement with any type of resinous material and without necessitating the use of rosin.

Although boric acid has been found to best serve the purposes of our invention because of its effectiveness as well as its cheapness and availability, we have found that small amounts of certain other substances also function as catalytic agents in substantially the same manner. Of these substances may be mentioned: phosphoric acid, tartaric acid, salicylic acid, citric acid, malic acid, benzoic acid, acetic acid and phenol. This group and also boric acid, is designated as group "A" for reference purposes. The general class of substances which thus function as equivalents to boric acid are characterized as weakly acid compounds, effective in relatively small amounts, at least partially soluble in the oil and capable of dissociating therein to provide a limited hydrogen ion concentration. Obviously, the substance should not be volatile to an appreciable extent under the condition of use. When any of the above or other substances are used as a substitute for boric acid the effective amount is determined as that amount which will produce in the linseed oil, approximately the same hydrogen ion concentration as is produced by 1 to 2% boric acid.

The action of zinc oxide in the formation of the cement is possibly manifold. Apparently it serves to neutralize the boric acid or other acid catalyst present in the solidified oil, and also to materially increase the rate of re-solidification of the cement after fluxing and the amount of linoxyn component formed by neutralizing or partial neutralizing acid substances present in the resinous material, or formed during the fluxing.

It is pointed out that in certain cases, particularly where the amount of acid substances present in the resinous material or formed during the fluxing operation is relatively small, that the amount of zinc oxide or its equivalent to be added may be reduced and even dispensed with entirely. The omission of the zinc oxide or its equivalent will however prolong the period required for the cement to attain the desired consistency. Where the resinous material is rosin or similar resin of a relatively pronounced acid nature the addition of zinc oxide or its equivalent in the manner prescribed will produce a cement of greatly improved quality. In all cases the addition of zinc oxide or its equivalent in relatively small amounts results in the formation of a cement of improved working and seasoning characteristics.

In addition to zinc oxide, we have found certain other substances which are equivalent in function. Of these may be mentioned calcium oxide and hydroxide, magnesium oxide, barium hydroxide, and hexamethylenetetramine. This group, and also zinc oxide is designated as group "B" for reference purposes. Substances in the general class which function as equivalents to zinc oxide, are characterized as weakly basic compounds capable of reacting with the acid substances present in the components of the cement or formed in the fluxing operation, and preferably capable of forming compounds soluble therein.

We have particularly pointed out above that the solidified oil produced by our method permits the use of a wide range of resinous material in the preparation of cement, inasmuch as the gel structure of the linoxyn component is relatively non-rigid and unstable, thus permitting the solidified oil to be fluxed without the use of rosin as heretofore required. By preference, therefore, we employ certain synthetic resins of the oil-soluble phenol-aldehyde type which serve to yield a product having greatly increased resistance to alkali. This feature is of major importance as it overcomes one of the most serious defects in linoleum as it is known today, namely, its deterioration under the action of alkali. Other types of synthetic resins, such as the glyptals, amberols, or vinyl resins may also be used, or, if desired, because of its cheapness, the conventional material, namely, rosin may be employed either alone or with the synthetic or other natural resins, or the like.

As distinguished from the linoleum cements heretofore produced by the conventional two stage process, the cement produced by our improved two stage process comprises a markedly decreased proportion of unoxidized oil, and markedly increased proportion of the solid linoxyn, and oxidized but uncoagulated oil. As the covering power or binding efficiency of the cement depends almost directly upon the amount of oxidized but uncoagulated oil, the increase in the proportion of this component correspondingly increases the efficiency of the cement as a binder. Thus our invention permits the use of a less proportion of cement in the third stage of the manufacture of linoleum thereby effecting a very material reduction in cost of materials, or if the usual amount of cement be used, results in a tougher, more flexible floor covering. Observing further that the amount of unoxidized oil in the cement produced according to our invention is reduced very substantially, it follows that the linoleum sheet produced in the fourth stage of manufacture may be seasoned or cured in proportionately less time, thus effecting further economies both in time and money while avoiding the production of "soft centered" merchandise.

An advantage of our invention, particularly from the practical and commercial standpoint which should not be overloked is that it may be practiced in the conventional type of equipment now in use without modification of the same.

The finished linoleum product obtained when employing our invention in the manufacture thereof is characterized by its increased toughness and flexibility. Furthermore, the decreased proportion of cement required in compounding the linoleum composition results in a product having a more dense, wear-resisting surface. Of chief importance, however, is the markedly increased resistance to alkalies exhibited by the product when made from cement prepared in accordance with our invention by fluxing the specially solidified oil with synthetic resins of the types specified.

While the preferred procedure has been described with reference to the treatment and use of linseed oil, our invention is also applicable to the manufacture of linoleum and linoleum cements from such other siccative oils or mixtures thereof with linseed oil as are commonly used for this purpose.

In describing our invention, we have attempted to set forth what are believed to be the correct theories as to the reactions which occur, but our invention is not limited by nor dependent upon such theories. Likewise, while we have fully described a preferred embodiment of our invention, and certain equivalent practices, our invention is not limited thereby except as defined in the appended claims.

We claim:

1. The process of making linoleum cement which comprises treating linseed oil with heat and oxygen in the presence of boric acid to produce a solidified oil; and fluxing said solidified oil with resinous material to produce a cement.

2. The process of making linoleum cement which comprises treating linseed oil with heat and oxygen in the presence of boric acid to produce a solidified oil; and fluxing said solidified oil with a synthetic resin to produce a cement.

3. The process of making linoleum cement which comprises treating linseed oil with heat and oxygen in the presence of boric acid to produce a solidified oil; and fluxing said solidified oil with a synthetic resin of the oil-soluble phenol-aldehyde type to produce a cement.

4. The process of making linoleum cement which comprises treating a siccative oil with heat and oxygen in the presence of a catalytic substance of group "A" to produce a solidified oil; and fluxing said solidified oil with a synthetic resin to produce a cement.

5. The process of making linoleum cement which comprises treating linseed oil with heat and oxygen in the presence of boric acid to produce a solidified oil; fluxing said solidified oil with resinous material; and effecting a re-solidification in the presence of zinc oxide to produce a cement.

6. The process of making linoleum cement which comprises treating linseed oil with heat and oxygen in the presence of boric acid to produce a solidified oil; fluxing said solidified oil with a synthetic resin; and effecting a re-solidification in the presence of zinc oxide to produce a cement.

7. The process of making linoleum cement which comprises treating linseed oil with heat and oxygen in the presence of boric acid to produce a solidified oil; fluxing said solidified oil with a synthetic resin of the oil-soluble phenol-aldehyde type; and effecting a re-solidification in the presence of zinc oxide to produce a cement.

8. The process of making linoleum cement which comprises oxidizing linseed oil in the presence of boric acid to produce a solidified oil; and fluxing said solidified oil with a synthetic resin to produce a cement.

9. The process of making linoleum cement which comprises oxidizing a siccative oil in the presence of a catalytic substance selected from group "A" to produce a solidified oil; fluxing said solidified oil with resinous material; and effecting re-solidification in the presence of a substance selected from group "B" to produce a cement.

10. The process of making a linoleum cement which comprises oxidizing a siccative oil and combining therewith a resinous material, the oxidation of the oil being conducted in the presence of boric acid.

11. The process of making a linoleum cement which comprises oxidizing linseed oil and combining therewith a resinous material, the oxidation of the oil being conducted in the presence of boric acid.

12. The process of making a linoleum cement which comprises oxidizing linseed oil and combining therewith a synthetic resin, the oxidation of the oil being conducted in the presence of boric acid.

ROBERT D. BONNEY.
WALTER S. EGGE.